United States Patent Office 3,434,765
Patented Mar. 25, 1969

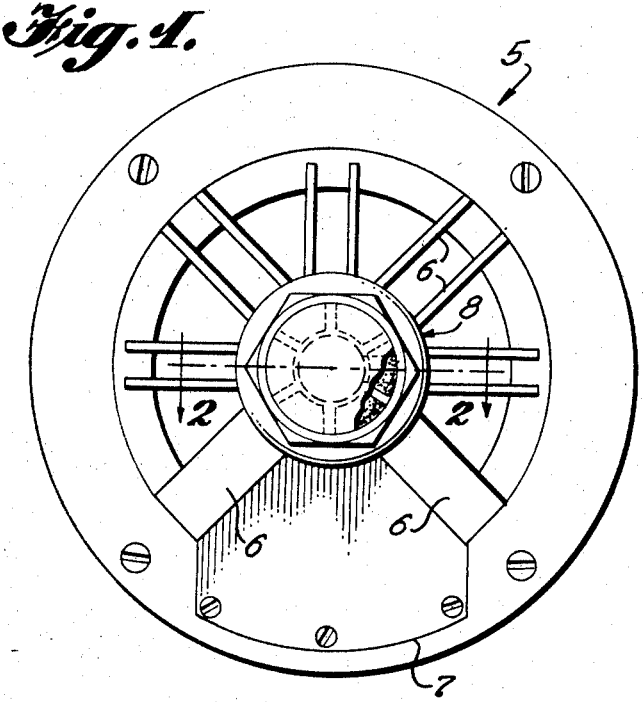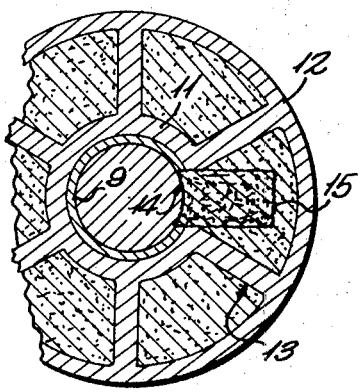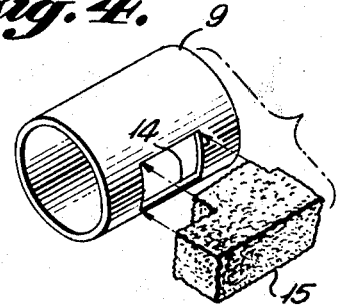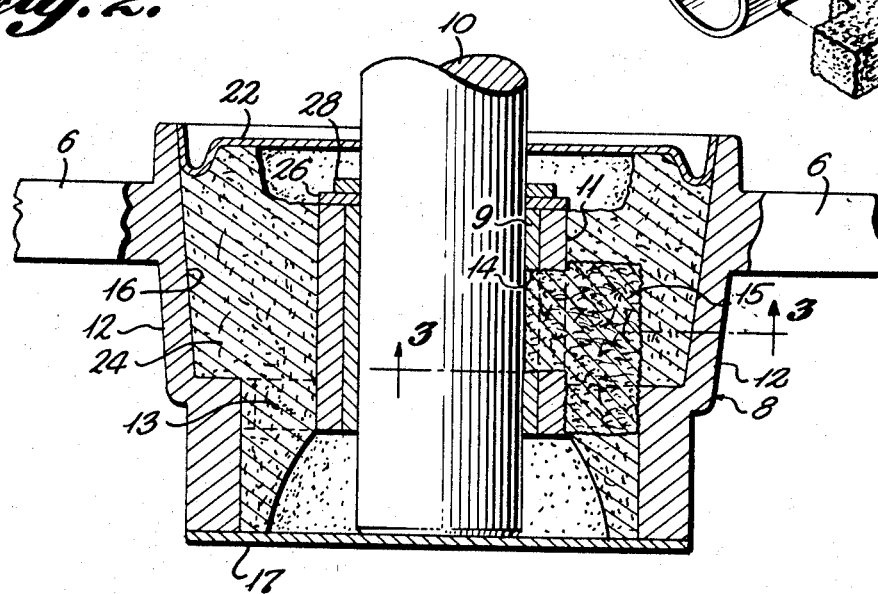

3,434,765
LUBRICATED BEARING ASSEMBLY AND
METHOD OF MAKING SAME
Martin L. Abel, Oak Park, Mich., assignor to Permawick Company, Inc., Detroit, Mich., a corporation of Michigan
Filed Feb. 28, 1967, Ser. No. 619,313
Int. Cl. F16c 1/24, 33/66, 13/02
U.S. Cl. 308—132
4 Claims

ABSTRACT OF THE DISCLOSURE

A self-lubricating sleeve bearing assembly having a lubricant reservoir surrounding the sleeve bearing with a window in the sleeve bearing for communicating the lubricant reservoir with the bearing surface. A felt contactor plug is positioned in the reservoir with a portion thereof extending into the window. An oil-impregnated wicking material fills the remainder of the reservoir and is molded about the contactor plug.

---

This invention relates to sleeve bearing assemblies having reservoirs containing an oil-impregnated wicking material, and more particularly it relates to a bearing assembly designed to prevent the solid particles of the wicking material from being drawn onto the bearing surface.

An injectable wicking material known to the art is discussed in my U.S. Patent No. 2,966,459, granted Dec. 27, 1960. The wicking material itself comprises very short cellulose fibers derived from comminuted wood-based paper stock, and is impregnated with any one of the wide variety of suitable bearing lubricating oils. In a typical application of the wicking material, the oil-impregnated wicking material is injected under pressure into a cavity adjacent to a sleeve bearing. The sleeve bearing has an opening therein, often referred to in the art as a window, which communicates with the cavity containing the injected wicking material. As the shaft rotates in the sleeve bearing, it draws oil from the wicking material fibers.

In some bearing applications, this drawing effect of the rotating shaft has a tendency to draw the wicking material fibers themselves through the window of the sleeve bearing and deposit them on the surface of the bearing. Normally this tendency, referred to in the art as window erosion, does not present particularly significant problems. However, in some more demanding bearing applications, even the possibility of window erosion cannot be tolerated.

It is accordingly one object of this invention to provide an improved sleeve bearing assembly in which the phenomenon of window erosion is substantially eliminated.

It is another object of this invention to provide an improved sleeve bearing assembly which avoids the problem of window erosion, and yet delivers sufficent oil to the bearing for adequate lubrication.

It is a further object of the present invention to provide an improved bearing assembly with the above advantages which can easily and efficiently be assembled in an automated operation.

Other objects and features of novelty of the invention will become apparent to one skilled in the art when referring to the following description, taken in conjunction with the accompanying drawings, wherein:

FIG. 1 is an end view of the bearing assembly with associated supports;

FIG. 2 is an enlarged sectional view taken along the lines 2—2 in FIG. 1;

FIG. 3 is a reduced sectional view taken along the lines 3—3 of FIG. 2; and

FIG. 4 is an exploded view of the bearing sleeve and contactor plug.

Referring initially to FIG. 1, there is disclosed an end bell 5 for an electric motor or the like having a sleeve bearing assembly 8 supported by radial arms 6 in a conventional manner. The end bell 5 is equipped with a detachable access plate 7.

Referring to FIGS. 2–4, a motor shaft 10 is shown extending through sleeve bearing 9 of the bearing assembly 8. The sleeve bearing 9 is held in position by an inner annular member 11 which is secured to an outer annular wall 12 of the bearing assembly by radial arms 13. Both sleeve bearing 9 and annular member 11 have aligned openings or windows 14 and 20 therein to accommodate a contactor plug 15. A projecting portion of the contactor plug extends through the windows 14 and 20 and slidably contacts the shaft. The main body of the contactor plug is contained within a cavity 16 defined by the annular wall 12. One end of the cavity 16 is closed by a plate 17 which is fastened to the end of the annular wall 12. The other end of the the cavity 16 is closed by a washer-shaped cover 22 through which the motor shaft 10 extends. The cavity 16 is filled with the oil-impregnated wicking material 24 which may be injected under pressure into the cavity 16 by any suitable means. A thrust washer 26 and oil slinger 28 are provided with the oil slinger fixed to the shaft 10 to rotate therewith and sling the oil escaping from the end of the sleeve bearing adjacent thereto radially outward into the annulus of wicking material 24 overlying the oil slinger. This provides a conventional closed recirculating system which prevents oil from escaping from the bearing assembly.

As best seen in FIGS. 2 and 4, the contactor plug 15 is T-shaped to insure that it will not slip through the windows 14 and 20. The projecting end of the contactor plug has a cross section which is substantially the same as the size of the windows 14 and 20 so that it effectively seals the windows in a manner to prevent the wicking material 24 from escaping therethrough. By injecting the oil-impregnated wicking material 24 into the cavity 16 under pressure after the contactor plug has been positioned as shown, the wicking material accurately molds itself about the main body of the contactor plug 15 which protrudes from the windows 14 and 20.

As the shaft rotates, it draws oil from the contactor plug 15 onto the shaft surface and the surface of the bearing. The contactor plug in turn draws oil from the wicking material 24 which is intimately molded thereabout. The presence of the contactor plug in the windows prevents any of the solid matter contained in the oil-impregnated wicking material from passing through the window, thus substantially eliminating the problem of window erosion discussed above. As previously described, the oil escaping from both ends of the sleeve bearing is recirculated back into the wicking material in a conventional manner.

The particular wicking material to be employed in the present invention may be of the type disclosed in my earlier U.S. Patent 2,966,459, in which the oil-absorbing portion of the wicking material comprises comminuted cellulose fibers derived from wood-based paper stock. If desired, the novel wicking material disclosed in my copending application Ser. No. 619,312, filed Feb. 28, 1967 wherein the oil-absorbing portion of the wicking material comprises cotton linter fibers can be used. The majority of the fibers of the oil-impregnated wicking material of both my aforementioned earlier patent and copending application are about two millimeters or less in length, as clearly brought out in the specification of my patent and application. It is because of these relatively short length fibers that the window erosion problem arises. However, the term "oil-impregnated wicking material" as used in the specification and claims is not to be construed as limited to wicking materials in which the oil-absorbing portion of the material is fibers. This term is intended to include any fluent oil-impregnated material in which oil-absorbing solids are present.

It is preferred that the contactor plug 15 be made of what has become known to the art as an F–5 felt, which is denser or more tightly matted that the well known F–12 felt which is commonly used for lubricating sleeve bearings. The contactor plug made of F–5 felt throttles the flow of oil to the bearings so that the oil feed rate from oil-impregnated cotton linters is between that produced by cotton linters and wood fibers when no contactor plug is present. The oil with which the wicking material is impregnated forms no part of the present invention, and can be selected from a long list of oils known to those skilled in the art to be suitable for lubrication of bearings.

As noted, one of the advantages of the present bearing assembly is that it is particularly adaptable to mass production techniques. The end bell can be clamped in an indexing table of existing machinery for injecting the aforementioned patented wicking material, and the contactor plug 15 can be inserted into the window of the sleeve bearing by a suitable tool at one station of the table. After the contactor plug has been placed into position, the cavity 16 may be filled with the wicking material at a second station of the machine. Specifically, the oil-impregnated wicking material may be injected into the cavity 16 from one end thereof, rather than through the windows 14 and 20, as is presently being done by electric motor manufacturers, by the same extrusion machinery now being used to extrude or inject the wicking material of my aforementioned patent, and the methods disclosed in my earlier U.S. Patents 3,226,801, granted Jan. 4, 1966 and 3,273,688, granted Sept. 20, 1966.

What is claimed is:

1. A bearing assembly comprising a sleeve bearing having a window therein, a contactor plug having a portion thereof projecting into said window, housing means for supporting said bearing and defining a chamber around said bearing and contactor plug, and an oil-impregnated wicking material substantially filling said chamber and molded into intimate engagement with said contactor plug, said oil-impregnated wicking material comprising a fluent mixture of oil and oil retaining particles, the majority of said particles having a maximum dimension of about two millimeters or less, whereby said contactor plug retains solid particles from said wicking material from passing through said window while permitting the oil from said wicking material to pass therethrough.

2. A bearing assembly comprising a sleeve bearing having a window therein, a contactor plug having lower and upper portions, said lower portion being press fit in said window in position to contact a shaft member to be journaled in said sleeve bearing, and housing means for supporting said sleeve bearing and defining a chamber about said bearing and contactor plug, an oil-impregnated wicking material substantially filling said chamber and molded into intimate engagement with said upper portion of said contactor plug, said oil-impregnated wicking material comprising a fluent mixture of oil and oil retaining particles, the majority of said particles having a maximum dimension of about two millimeters or less, whereby said contactor plug retains solid particles from said wicking material from passing from said chamber through said window while permitting the oil from said wicking material to pass therethrough.

3. The bearing assembly of claim 2 wherein said oil-impregnated wicking material comprises oil-impregnated cotton linter fibers and said contactor plug is made of a tightly matted felt material.

4. A method of making a lubricated sleeve bearing assembly having a windowed sleeve bearing and a cavity surrounding said bearing adapted to receive an oil-impregnated wicking material comprising inserting a contactor plug into the window in said sleeve bearing, and thereafter injecting an oil-impregnated wicking material into said cavity under pressure to mold the material about the contactor plug and substantially fill the cavity whereby said wicking material delivers oil to said contactor plug for lubricating the bearing surface of said sleeve bearing.

References Cited

UNITED STATES PATENTS

| 2,123,872 | 7/1938  | Whiteley  | 308—132 |
| 2,960,371 | 11/1960 | Staak     | 308—132 |
| 2,966,459 | 12/1960 | Abel      | 252—14  |
| 3,140,128 | 7/1964  | Tann      | 308—240 |
| 3,224,819 | 12/1965 | Hunt      | 308—132 |
| 3,235,317 | 2/1966  | Cunninham | 308—132 |
| 3,030,157 | 4/1962  | Dederich  | 308—132 |

MARTIN P. SCHWADRON, *Primary Examiner.*

FRANK SUSKO, *Assistant Examiner.*